June 20, 1950          A. L. ASARO ET AL          2,512,194

FISH UNLOADING APPARATUS

Filed Feb. 21, 1947          2 Sheets-Sheet 1

INVENTOR.
Anthony L. Asaro
Joseph E. Bijeci
BY

ATTORNEY

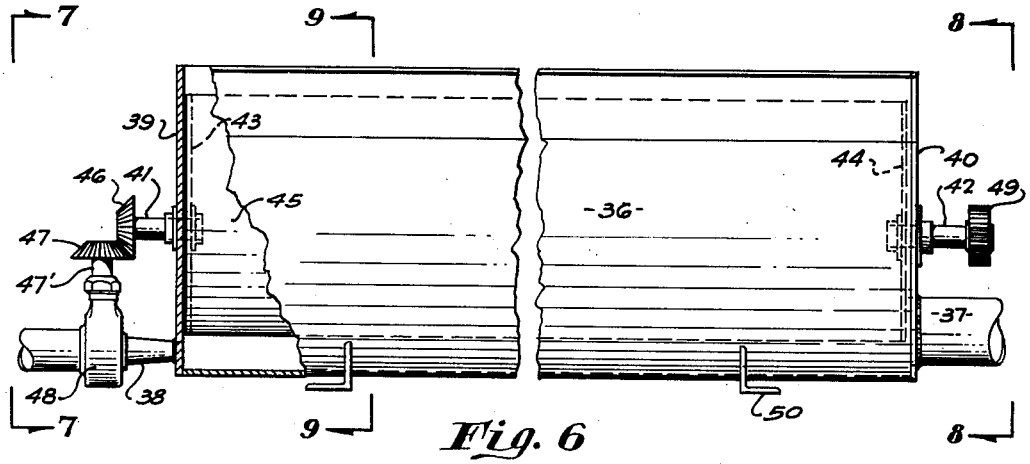
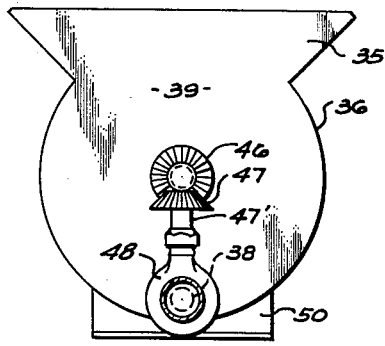
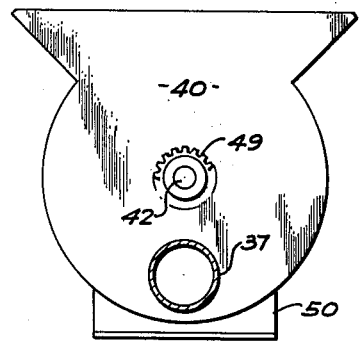
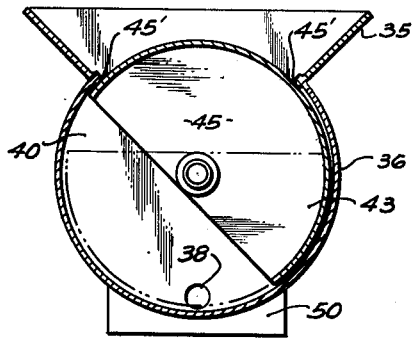

Patented June 20, 1950

2,512,194

UNITED STATES PATENT OFFICE 2,512,194

FISH UNLOADING APPARATUS

Anthony L. Asaro, San Francisco, and Joseph E. Bileci, Monterey, Calif.

Application February 21, 1947, Serial No. 730,140

1 Claim. (Cl. 302—14)

Our invention relates to a means for unloading the cargo of a vessel and it has especial reference to a device for removing fish from the hold of a boat by hydraulic means.

The chief object of our invention is to provide a simple and efficient means by which the fish cargo of a vessel may be expeditiously unloaded, with considerable economy in time and labor, and which may or may not constitute a permanent installation in a fishing vessel.

Other objects of the invention are to provide a simple device in which the conveyance of a charge of fish from any source of lading may be practically and continuously effected hydraulically; in which the apparatus for attaining this end may be readily and economically set in place wherever desired for use, and to provide a device of few parts that will carry into effect these objects.

Other objects will appear from the following specification, in connection with the accompanying drawings, which are illustrative of a preferred form of embodiment of the invention and which obviously may be varyingly modified, without departing from the spirit of the invention or the scope of the appended claim.

In the drawings,

Fig. 6 is an elevational view of a slightly modified form of our invention.

Fig. 7 is a front view seen in the direction of arrows 7—7 of Fig. 6.

Fig. 8 is a rear view seen in the direction of arrows 8—8 of Fig. 6.

Fig. 9 is a section on line 9—9 of Fig. 6, looking in the direction of the arrows.

Generically our invention embodies a chamber or area in which a quantity of fish is arranged to be deposited or received, means for closing the chamber or area and hydraulic means for removing the fish from the chamber, which may be one of a battery or several, in which event, as pointed out hereinafter, the chambers are adapted to be successively delivered of their charges continuously, so long as the supply of fish exists.

Figure 1:
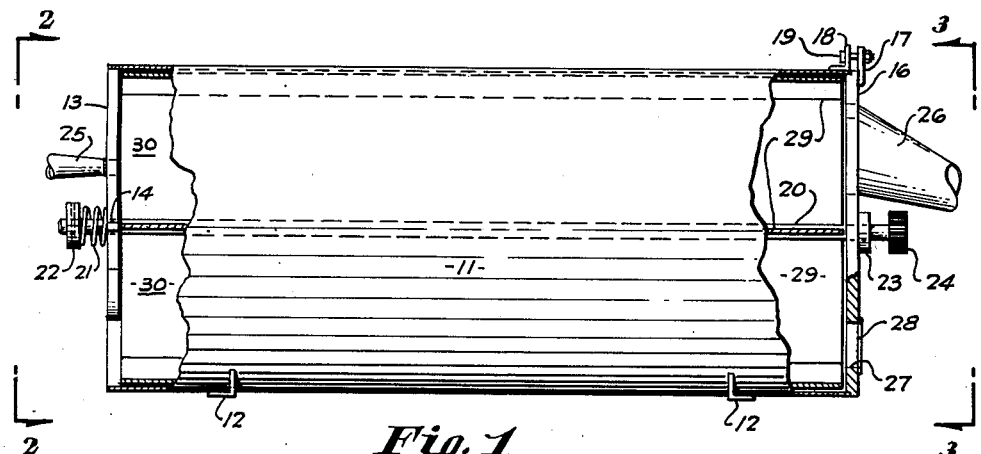
Fig. 1 is a side elevational view, partly in section, showing our invention.
Figure 2:
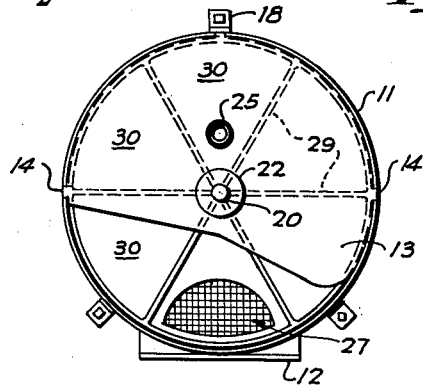
Fig. 2 is a front end view, seen in the direction of the arrows 2—2 of Fig. 1.
Figure 3:
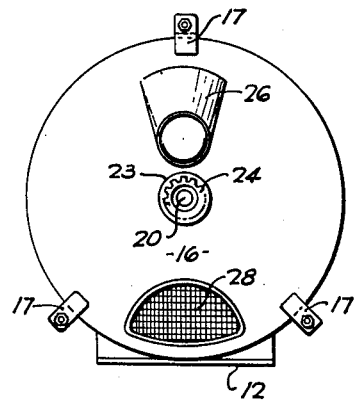
Fig. 3 is a rear end view seen in the direction of the arrows 3—3 of Fig. 1.
Figure 4:
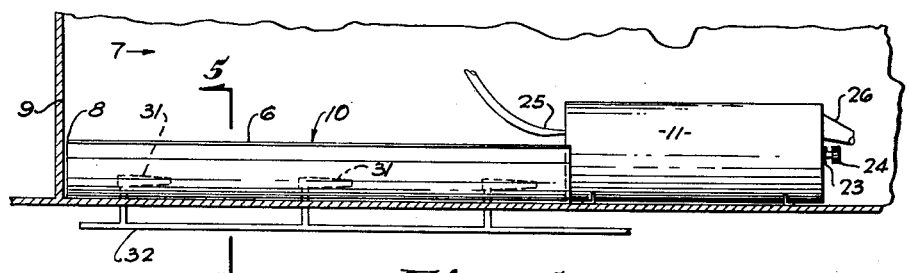
Fig. 4 is a fragmentary sectional elevation, showing a trough and jets for advancing fish to the conveyor.
Figure 5:
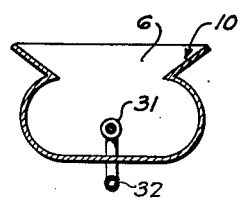
Fig. 5 is a section on line 5—5 of Fig. 4, looking in the direction of the arrows.

Referring in detail to the drawings, 6 designates a trough arranged to be positioned in the hold of a vessel 7, and having a wall 8 that is adapted to close one end of the trough and to be placed in engagement with a bulkhead 9 in the vessel. The walls of the trough, at their upper edges are inwardly declined, as seen at 10, to deflect the fish into the trough, which at its other end is open and fitted in any desirable manner about the lower portion of a cylindrical housing 11, that is suitably supported within the vessel, as on legs 12, secured thereto. The front of the housing 11 is provided with a plate 13, from which a section of the bottom is removed, as seen in Fig. 2, to afford free communication between the trough 6 and the interior of the cylindrical housing, for purposes presently to appear. A preferable form of association of the plate 13 with the front end of the housing 11, is by way of peripherally extended projections 14, that are arranged to fit in recesses in the end of the housing. The back or rear of the housing is closed by a discal plate 16, that is provided with lugs 17 arranged for co-operation with similar lugs 18 on the housing through the medium of fastening means, as bolts and nuts, generally indicated at 19, to maintain said plate 16 in close connection with the rear of said housing. The plates 13 and 16 journal an axial shaft 20, that extends through the housing and beyond said plates, the former 13 of which, is held in position with the projections 14 engaged in the recesses 15, by resilient means, as a helical spring 21, that is maintained tensioned against said plate 13, by a collar 22, pinned or otherwise secured to the projecting end of the shaft 20. The portion of the shaft which extends beyond the plate 16 mounts a collar 23, disposed in snug relation to the plate, and a pinion 24 for connection with a geared source of power, not shown, to rotate said shaft. The plate 13 has a nozzle 25, arranged to connect to a source of hydraulic pressure for delivering a high speed jet to the upper part of said housing. The plate 16 has a fish discharge 26 in the upper part thereof, that is, above the axis of the housing, and a water outlet 27 below the axis of the housing, a screen 28 being fitted over said outlet. Secured in any desirable manner to said shaft 20 is a plurality of radially disposed and equally spaced fins or vanes 29, each pair of which constitutes a compartment 30, the open end of which is closed when rotated to a position above the axis of the shaft to hold entrapped a quantity of fish, and registers with the trough 6 when below said axis to receive a charge of fish. Fish deposited into the trough 6 are conveyed into the respective compartment 30 aligned therewith, by means of pressure water jets issuing from nozzles 31, positioned in the trough and connected with a manifold supply source 32. Water used to convey the fish to the compartments is spilled or wasted through the outlet 27, while the screen 28 prevents the escape of the fish. When the rotor carries the fish-containing compartments 30 past the open or removed section of the plate 13, and sequentially alines them with the jet, issuing from the nozzle 25, and with the fish outlet 26, the compartments are emptied of their contents through the discharge member 26. This charging and discharging of fish is a continuous one. The discharge member 26, obviously is adapted to be connected to any means, not shown, for delivering the fish to a desired locus.

While the general purpose of the invention is to remove from the hold of a ship, continuously small or relatively small quantities of fish eventually to unload the cargo in rapid time without damage or mutilation of the fish, the instrumentality shown in Figs. 1 to 5, by which this is accomplished, may be modified in a variety of forms, such, for instance, as exemplified in the structure shown in Figs. 6 to 9 inclusive. In this showing, the fish are deposited directly into the housing 36 through the funnel or hopper 35, which surmounts the housing 36, from which they are discharged through the outlet 37 at the rear and bottom of the tank, by a pressure jet discharging from a valve controlled nozzle 38, connected to a source of fluid pressure not shown. Plates 39 and 40, respectively, close and are secured in any manner, to the ends of the housing. Each of the plates journals an axially alined trunnion 41 and 42, respectively, which trunnions are secured axially to ends or end walls 43 and 44 of an arcuate closure member 45, that is rotatable in said housing to open and close same to the access of fish. This closure member is substantially a semi-cylindrical shell and extends the full length of the housing 36. Gaskets 45' disposed on opposite sides of the opening in said housing 36, serve to insure a substantially tight seal between the closure member and housing during the period of discharge of the fish. The trunnion 41 mounts a bevel gear 46 that meshes with a bevel gear 47 on the end of a stem 47' in a valve housing 48 on the pipe 38. The trunnion 42 mounts a spur gear 49, that is arranged for gear connection, not shown, with a source of power. When the spur gear 49 is operated, the closure member 45 will rotate within the housing and enclose the fish that have entered the housing and the closure member. Simultaneously, the bevel gear 46 will open the valve in the housing 48, and cause a stream of water to be jetted into the housing 36 and the fish therein to be discharged therefrom through the outlet 37, which is mounted on the end plate 40 and which may be connected with a conduit for conveying the fish to any desired point. During the discharge of the fish, the closure member is revolving and the jet-controlling valve is held open. By the time the closure member opens the tank or housing 36 to receive a new supply of fish, the valve will have closed and remain closed until the member 45 closes the housing 36.

Suitable supports for the housing are provided by legs or other devices 50.

It will be observed that in both embodiments of the invention represented, individual quantities of fish are charged into the housing either by the force of water or by gravity and enclosed, and then discharged therefrom in continual sequence by hydraulic pressure. While we have disclosed these particular forms as expressive of our invention, we do not wish to be limited thereby to the particular constructions detailed, but desire to cover all modifications that may come within the scope of the claim.

Having thus described our invention, what we claim and desire to secure by Letters Patent of the United States, is:

In a device of the character disclosed, a horizontally disposed cylindrical chamber having recesses in the front end and lugs on the rear end thereof, a plate on the front end of said chamber; a plate covering the rear of said chamber; a shaft journaled in and extending centrally through and beyond said plates; a plurality of vanes secured to said shaft and extending radially therefrom to form V-compartments within said chamber; said front plate having a hydraulic ejecting means above said shaft and peripheral projections for engaging the recesses in the front of said cylindrical chamber and a portion of the bottom thereof being cut away to provide an inlet to several of said compartments simultaneously; said rear plate having lugs alined with the lugs on said chamber and means for engaging said lugs to secure said plate removably to the rear of said chamber; said plate having an outlet above said shaft and a screened outlet below said shaft for draining the water from said compartments; said shaft having a pinion at one end and a collar on the other end, and a spring between said collar and front plate for removably holding said plate against the front of said chamber with the projections thereof engaged in said recesses.

ANTHONY L. ASARO.
JOSEPH E. BILECI.

REFERENCES CITED

The following references are of record in the file of this patent:

UNITED STATES PATENTS

| Number | Name | Date |
|---|---|---|
| 1,827,068 | Carmichael | Oct. 13, 1931 |
| 1,871,516 | Gurney | Aug. 16, 1932 |
| 2,162,415 | Allen | June 13, 1939 |
| 2,396,305 | Toft | Mar. 12, 1946 |